Sept. 13, 1960   E. A. FINKE   2,952,299
METHOD AND APPARATUS FOR MAKING BAGS OF THERMOPLASTIC TUBING
Filed Aug. 16, 1955   2 Sheets-Sheet 1
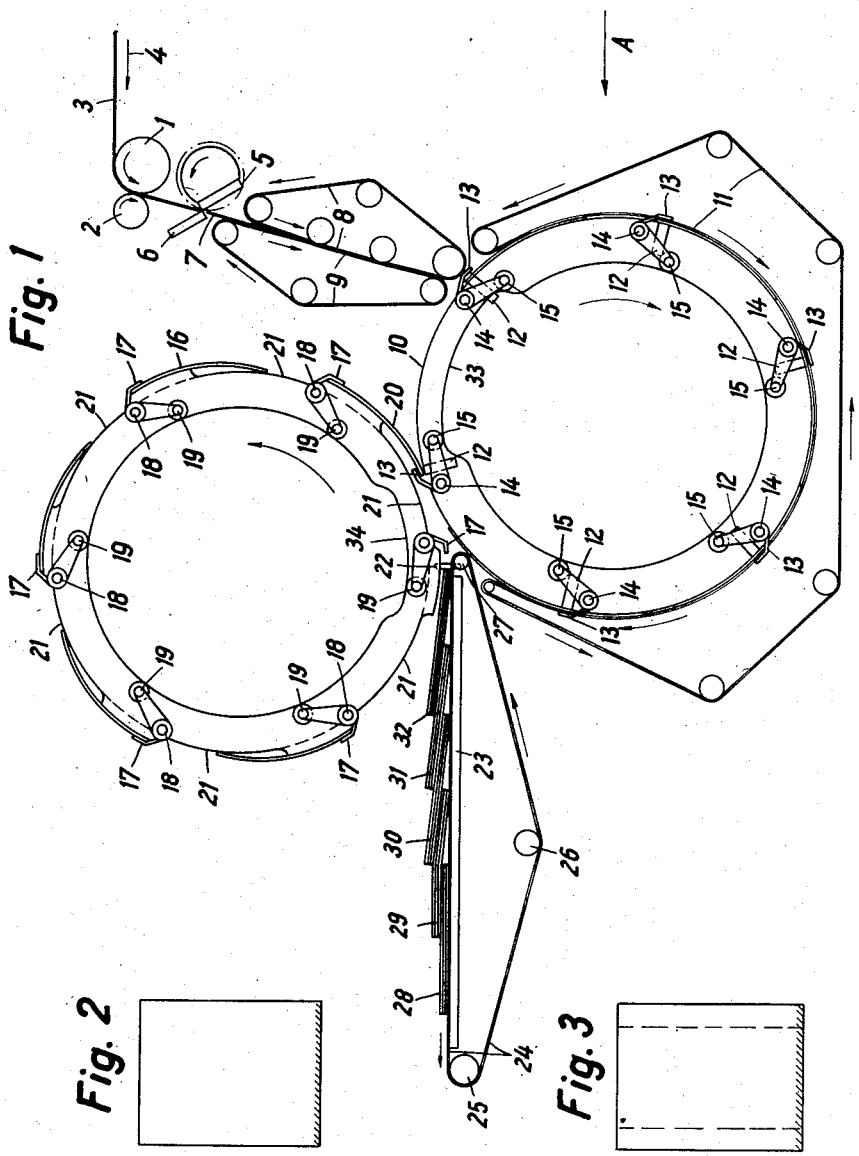
Inventor:
E. A. Finke
Attys.

Sept. 13, 1960 E. A. FINKE 2,952,299
METHOD AND APPARATUS FOR MAKING BAGS OF THERMOPLASTIC TUBING
Filed Aug. 16, 1955 2 Sheets-Sheet 2
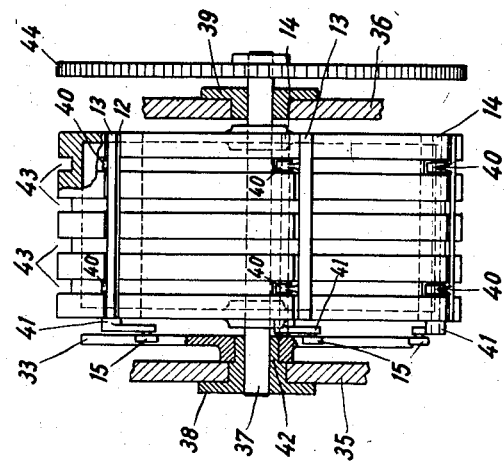
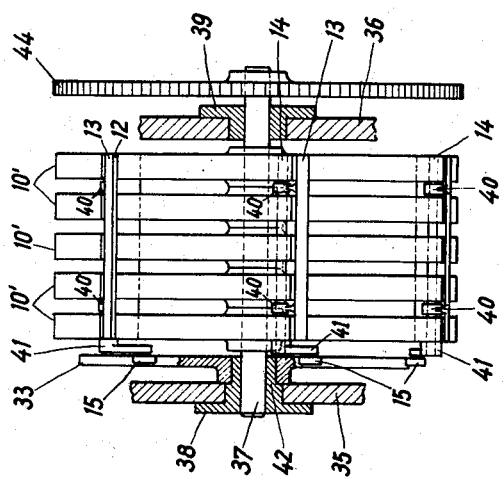
Inventor:
E. A. Finke

United States Patent Office

2,952,299
Patented Sept. 13, 1960

2,952,299

METHOD AND APPARATUS FOR MAKING BAGS OF THERMOPLASTIC TUBING

Ernst Arno Finke, Lengerich, Germany, assignor to Windmoller & Holscher, a limited partnership of Germany Filed Aug. 16, 1955, Ser. No. 528,581

Claims priority, application Germany Oct. 20, 1954

11 Claims. (Cl. 154—42)

The present invention relates broadly to the art of container manufacturing.

More particularly this invention relates to a method of and apparatus for making bags from thermoplastic or like material.

Flat and satchel type bags have been made from thermoplastic materials, for example, foils of polyethylene, pliofilm and similar substances, or from flexible material or foils surface coated with thermoplastic materials. Such foils or surface coated materials may be seamed, adhered or welded together with heat. Bags manufactured from these materials are constructed from tubing which may be either the seamless variety or that which is provided with a longitudinal seam and either of which is transversely sealed or cross welded to form the bag bottom. The present invention is particularly directed to the manufacture of bag bottoms.

With prior known methods of manufacturing bags with transversely sealed or seamed bottoms the number of bags produced per unit of time was determined by the time of welding or seaming per bag bottom plus the time consumed in cooling the seam within the apparatus that effected the same. If the total time per bag approximates three seconds, then twenty bags could be produced per minute. Endeavors to improve this output were unsuccessful due to the fact that it is practically impossible to shorten the welding time per bag bottom. The cross welding or transverse seaming or sealing of the tubing at spaced intervals equal in length to the size of the bag to be produced has the disadvantage that the tubing cannot be cut immediately adjacent each welded seam or seal because the seal or welded area may extend somewhat beyond the jaws of the welding machine so that the cut does not always produce an open end to form a mouth for the bag at each cutting. Consequently the cross cut utilized with such production methods must be effected at some distance from the seam with the result that each bag produced has a portion of tubing extending from the bag bottom seam and which portion is wasted.

It was a further disadvantage due to the fact that the thermoplastic material adhered to the jaws of the welding machine so that the detachment of the bags from the weld jaws and then piling of the same encountered difficulties.

It is therefore an object of this invention to provide a method of and apparatus from making bags for continuous lengths of tubing formed from the thermoplastic or like materials. It is a further object to provide a method of and apparatus for making bags from thermoplastic or the like tubing in which the number of bags produced per unit of time is substantially increased.

A further object is to form the bag bottoms in a fashion to eliminate the wastage of tubing.

It is a still more specific object to provide a method of and apparatus for making bags in which a transverse seal or seam is provided to constitute the bag bottom and in which the sealed bag is positively detached from the sealing means.

In accomplishing the method of the invention, the tubing is cut into bag lengths which are then fed in succession to sealing means embodying a series of sealing stations. The sealing of the rear end of each bag length is effected by positively gripping and applying thereto so that the seams extend to the outermost end of the length with the leading end of the bag being seamed being freed for being positively grasped or gripped and extracted or withdrawn from the sealing device.

A further object is to provide apparatus whereby a running length of tubing is cut into individual bag lengths in which the bags are continuously passed through the apparatus and one end of each bag length being transversely seamed to form a bag bottom.

As a still more specific object, the invention provides movable heat and pressure sealing apparatus for forming bag bottoms, said apparatus incorporating means at each of a plurality of sealing stations for positively gripping and applying localized pressure to opposite faces of the end portion of each bag bottom and for applying heat thereto, and in addition the apparatus includes means cooperating therewith for gripping the leading edge of the successively formed bags to positively remove them from the sealing apparatus.

Further and more specific objects will be apparent from the following description taken in connection with the accompanying drawings, in which:

Figure 1 diagrammatically illustrates an embodiment of the apparatus constructed in accordance with the invention and with the parts being in side elevation.

Figure 2 is a plan view of a flat bag without lateral gussets as produced by this invention.

Figure 3 is a plan view of an additional type bag having lateral gussets as produced by the present invention.

Figure 4 illustrates partly in cross section longitudinally of the axis of the sealing means and partly in elevation one embodiment of the heat and pressure sealing apparatus which seals the bag bottoms as viewed in the direction of the arrow A in Figure 1.

Figure 5 is a similar view of another embodiment of the heat and pressure sealing apparatus.

As shown in the drawings, a running length of tubing denoted at 3 is fed forward in flattened condition by feed rollers 1 and 2, the tubing moving in the direction of the arrow 4. The running length is fed into the sphere of influence of cross cutting means comprising a rotary knife 5 and a cooperating stationary knife 6 of known construction which sever the running length into individual bag lengths.

The tubing 3 may be a seamless tube of thermoplastic material, for example, polyethelene, or it may previously have been formed from a flat web of thermoplastic material or a material provided with a thermoplastic coating and folded in a known manner into tube form and provided with a longitudinal seam. The web may be gusseted if desired, or it may have indicia or other printing thereon in spaced positions along the lengths of it. As determined by a known control mechanism the printing or indicia will appear in the exact position on each severed bag length.

The successive individual lengths 7 severed by the cross cutting means are fed into the bight between two cooperating endless belts 8 and 9 constituting feeding and guide means moving in the direction of the arrows and each mounted over groups of rollers, one of which is a driven roller. After the bag lengths have passed through the belt feeding and guide means the leading edge of each length is pushed by the guide means between the outer periphery of a rotary drum 10 carrying the bottom closing means and an endless belt or tape 11 which is driven at the same speed as the rotary drum. The belt 11 revolves about suitably arranged rollers at least one of which is driven and is in contact with approximately three-fourths of the circumference of the rotary drum. To ensure that the successive bag lengths pass from the belt guides 8 and 9 to the rotary drum 10, the latter may be provided with suction orifices not shown, or alternatively air may be blown onto the successive lengths by suitable jets not shown, so that these lengths are forced to pass between the tape or belt 11 and the periphery of the drum 10.

The rotary drum is advantageously constructed from a plurality of circular discs 10' (Figure 4) mounted at intervals on a common spindle 37, supported in the side frames 35, 36 by bearings 38, 39 and driven by the gear 44, so that the bag extracting tools described hereinafter can penetrate or move into the spaces between the successive discs. Alternatively a cylinder having circumferential grooves 43 as shown in Figure 5 can constitute the rotary drum or body 10. On its surface, the rotary body or drum is provided with heating means at equi-spaced points about its circumference. As shown in the drawings, there are six electrically heated transversely extending bars or elements 12 which are heated by a suitable means not shown. The heating bars 12 are connected to the current supply, for example by means of slip rings or the like, so that these bars are heated during a certain portion of their travel with the drum 10. Additionally, the heating bars can be connected with a coolant supply pipe not shown, so that they can be cooled from the interior.

Adjacent each heating bar and cooperating therewith are gripper rails 13 pivotally mounted about axles 14 by levers 40 (Figures 4 and 5) for cooperation with the heating bars 12 to form releasable gripping rails. The rails 13 are moved about their axles 14 against a resilient force not shown by levers 41 and followers 15 cooperating with a stationary cam disc 33 mounted on the flange 42 of the bearing 38. The construction and operation of such gripping means are well known in the art.

The rotary body 11 is so related to the cutting mechanism 5 and 6 that the rear end of each bag length 7 is deposited upon a heating bar 12 and is immediately clamped thereto by the associated descending gripper rail 13. By a suitable adjustment of the speeds a bag length will be delivered to each of the gripping means 12 and 13 in turn and the bag bottoms are glued and transversely seamed or sealed due to the heat applied by the bars 12 and with the free leading end of successive bag lengths being held against the drum by the belt or tape 11 so that the seam is effected by heat and pressure during the interval of rotation of the heating bars in which current is supplied thereto. The heating bars are subsequently cooled by turning off the current for a portion of their rotary movement which cooling effect may be intensified by passing a coolant through the interior of the heating bars.

In the arrangement of Figure 1 there is available for the seaming and cooling actions a period of time equal to about five-sixths of the time of one revolution of the rotary body. The tube or bag lengths move in contact with the circumference of the rotary body until withdrawn therefrom by withdrawing means referred to hereinafter. This path on the rotary body is equal to five times the distance separating any two of the six heating stations which are disposed at equal distance about the rotary body or drum means 10. While a bag bottom is being completed along this rotary path, five bag lengths will reach the bottom closing means on the rotary body 10. Thus five bags may be completed during each welding period in accordance with the invention. It is clear that by equipping an appropriately larger rotary body with more welding bars or stations the output of the apparatus can be increased. The bottoms of the bags produced by this invention are closed right up to the severed edge so there is no waste tubing adjacent the bottom seam or weld.

After the successive bags have passed from beneath the belt or tape 11 their leading edges are no longer pressed down by the tape during the final portion of their revolution with the rotary body. With suction orifices, not shown, or by utilizing an air jet means, not shown, the bag lengths may be held against the circumference of the rotary body 10 until they reach the delivery station. For removing the completed bags from the rotary body 10 the leading end of each bag length is free at the delivery point and is gripped in a manner to impart a light pull to the bag in order to readily detach it from the welding jaws.

In the form shown in the drawings, there is a gripper cylinder 16 revolving in the direction of the arrow toward the rotary drum for withdrawing and delivering the finished bags. The circumferential velocity of the gripper cylinder is the same as that of the rotary body 10 and on the periphery of the gripper cylinder are gripper means 17 arranged at intervals equal to those intervals separating the heating bars 12 that are mounted on the periphery of the rotary body 10. In the form shown in the drawings, there are six gripper means 17. The gripper means 17 are mounted for pivoting movement about points 18 and are actuated by a stationary cam disc 34, through followers 19.

The grippers 17 open when they approach the rotary body 10 and are designed and positioned so that they can engage in the spaces between the component discs forming the rotary body or in the grooves in the rotary body if it is of grooved construction. Furthermore, the gripper cylinder 16 and the rotary body 10 are so adjusted in relation to one another that the grippers or fingers 17 engage in the grooves or spaces between two of the sealing stations 12 immediately at the leading end, that is the open end of the completed bag, so that when the gripper fingers 17 are closed they fasten the said leading end against the raised portions of gripper cylinder 16. As the cylinder 16 and rotary body continue their movement the gripper rails 13 open and move away from the heating bar 12 so that continued rotation causes the gripper fingers 17 carried by cylinder 16 to positively grip the leading ends of and detach the successive bags from the heating bars even in the event a bag bottom slightly adheres to the bars. The numeral 20 denotes a bag immediately after having been taken over by the gripper cylinder 16. To provide space for the passage of the open gripper rails 13 of the rotary body 10, the periphery of the gripper cylinder 16 is recessed as at 21 between adjacent gripper means 17. In other words, the periphery of this rotary cylinder 16 is relieved at equi-spaced portions, which due to the synchronization of the rotary movements of the body 10 and the cylinder 16, permits the passage of the raised gripper rails 13 while the successive bags such as at 20 are being withdrawn from the successive heating means or bars 12.

In the continued rotation of the gripper cylinder 16, the bags are held against the raised portions between the recess portions 21 by the gripper fingers 17 until the cylinder reaches a stop denoted at 22. Immediately before this stop is reached, the grippers 17 are opened and the bags drop in front of the stop. The completed bags are deposited on a table 23 over which passes an endless belt 24. This belt is guided over rollers 25, 26 and 27 and is driven in any known manner. The belt is preferably moved intermittently in a direction indicated by the arrow. With this arrangement the bags deposited on the belt are deposited in a substantial horizontal position to form a pile such as at 28 of a given number of bags following which the belt is moved so that the next pile of bags 29 is overlapped onto the top of pile 28. The result is that a series of overlapping stacks of bags 28 to 32 are formed. The stacks may then be counted and removed by operators at the remote end of the table 23 and packed. The aforedescribed horizontal overlapping arrangement at the delivery end provides special advantages because the material utilized in the manufacture of these bags is very pliable and with any other type of arrangement the stacks would not be orderly.

In instances where bags might be made of a stiffer material, the invention contemplates a delivery arrangement in which the bags are deposited in upright position.

According to the method of the invention the bags are made from thermoplastic material, or from material coated with a thermoplastic substance, in the form of tubing which may be seamless or have a longitudinal seam; the bottom of each bag being formed by transversely welding or hot-gluing of the rear open end in a manner such that no wasted pieces of bag-length are left at the bottom seam. Furthermore, the method of the invention enables a considerably higher output of finished bags to be obtained than is possible with the known manufacturing methods, and this output can now be increased at will.

The machine for the performance of the method of the invention is of simple design, enables the welding or hot gluing to be performed without interrupting the travel of the material, and ensures positive guiding and transfer of the bag lengths during their travel through the machine, especially when they have to be removed from the sealing device where sticking or adhering to the same means is possible.

The present invention may be applied to the manufacture of all kinds of flat bags and satchel bags, the bottom of which is formed by simple welding or hot-gluing.

Moreover the invention provides an improved arrangement of manufacturing bags and transversely sealing the end thereof which incorporates means for positively gripping the trailing end of continuously fed successive bag lengths and applying a grip to opposite faces of the same by a heating or sealing means, said combined heating and gripping means being operative responsive to rotation of the drum to open at a withdrawing station and rotary means synchronized with the drum incorporating rotation responsive gripping means for positively gripping the leading edge of successive bags and withdrawing the same from the heating means for transport to a delivery station.

Since certain obvious changes may be made in the illustrated method and apparatus without departing from the scope of the invention, it is intended that all matter contained herein be interpreted in an illustrative and not in a limiting sense.

What is claimed is:

1. Apparatus for continuously making bags from a continuous running length of tubing of thermoplastic material comprising means for continuously feeding said running length, continuously operable means for cutting said tubing transversely to form successive bag lengths, a continuously moving bag sealing mechanism comprising a plurality of axially spaced rotatable discs and, means providing a plurality of equi-spaced sealing stations at the periphery of the discs including at each station a fixed heating element and movable gripper means, means, means for feeding successive lengths into engagement with the periphery of the discs so that the rear ends of the lengths as regards the direction of feed overlie the fixed heating elements at each station, means for actuating the gripper means to grasp the rear ends of the lengths to apply localized pressure along the rear ends thereof to hold the lengths in contact with the respective fixed heating elements, means for constraining the ungrasped leading ends of the successive lengths to move with the stations throughout a substantial length of the periphery of the discs so as to effect adequate sealing, a rotatably mounted cylinder mounted adjacent said discs and disposed to have its periphery move past the perimeter of the discs at a position which as regards the path of movement of the lengths is after the location of the means for feeding the lengths, movable gripper elements carried by said last mentioned cylinder for positively grasping the leading ends of successive lengths to apply such leading ends against the cylinder to move with the cylinder to start to remove them from the respective stations after they have been sealed, means for actuating the gripper means to release the rear ends of the lengths and the rotation of the discs and cylinder and the mutual spacing and movement of the respective gripper elements being synchronized so that successive gripper elements remove a sealed bag from successive stations.

2. Apparatus for making bags as claimed in claim 1 in which endless flexible supporting means are mounted to engage the periphery of the discs over a substantial length thereof constitute the means for constraining the ungrasped leading ends to move with the stations a distance such as to insure adequate sealing of the grasped rear ends.

3. Apparatus for making bags as claimed in claim 2 in which the means for feeding successive lengths to the stations comprise a pair of moving endless belts having parts moving in parallel paths to form cooperating surfaces between which the lengths are fed and said parallel paths terminating adjacent the path of travel of the perimeter of the discs at a position before the engagement of the endless flexible supporting means with the perimeter of the discs, said rotatably mounted cylinder having its axis parallel to the axis of the discs and being disposed to have its periphery move adjacent the perimeter of the discs at a position in the path of movement of the discs which in relation to the path of movement of the lengths is after the terminal ends of the path of said endless belts.

4. Apparatus for making bags from a continuous length of tubing of thermoplastic material, comprising cutting means for transversely cutting said tubing into successive bag lengths, a continuously moving bag sealing means including a plurality of spaced sealing stations, heating elements at each station to effect sealing of one end of successive bag lengths, means for cooling each heating element after a bag length has been heat sealed thereby, means for feeding successive bag lengths to said sealing means to position a bag length at each station with its trailing end as regards the direction of feed juxtapositioned on the heating element at the station, movable gripper means carried by the continuously moving bag sealing means and cooperable with the respective heating elements for positively applying localized pressure transversely along the face of the trailing end remote from the heating element to hold said end of each length against the respective heating element during movement thereof, means constraining the leading ends of successive lengths to move with the stations during the sealing of the trailing end thereof and means operable at a subsequent position in the path of movement of the stations for positively grasping opposite faces of the leading end of each bag length and removing the same from the heating elements after the lengths have been sealed.

5. Apparatus for making bags from a continuous running length of tubing of thermoplastic material, comprising continuously operably cutting means for transversely cutting said tubing into individual bag lengths, a continuously moving bag sealing means including a plurality of equi-spaced sealing stations, continuously operable means for feeding successive bag lengths to said sealing means to position successive lengths at successive stations, cooperable, fixed and movable means at each station for grasping opposite faces of the rear end only of successive bag lengths and applying heat and pressure thereto to seal the said rear ends, means independent of said cooperable fixed and movable means for constraining the ungrasped leading end of successive bag lengths to move with the stations a distance sufficient to ensure adequate sealing, and movable, continuously operable means synchronized with the movement of the bag sealing means and including movable gripper means for gripping opposite faces of the leading ends and positively removing the successive bag lengths from the successive sealing stations after such lengths have been sealed.

6. Apparatus for making bags from a continuous running length of tubing of thermoplastic material comprising cutting means for transversely cutting said tubing into successive bag lengths, a continuously moving bag sealing means including a rotatable body, a plurality of equi-circumferentially spaced heating means on the periphery of the body, continuously operable feeding means for feeding successive bag lengths into engagement with said body to position a bag length at each sealing station, movable means carried by the body adjacent each heating means for applying the rear end only of successive bag lengths against the respective heating means so as to apply heat and pressure directly to opposite faces of the rear ends of the successive lengths to seal the same during turning of the body, means independent of said body and movable means and cooperable with the body for constraining the ungrasped leading end of successive bag lengths to maintain contact with the body and move with the heating means during sealing, and means for positively removing bag lengths from the respective stations after they have been sealed.

7. Apparatus for making bags from a continuous running length of tubing of thermoplastic material comprising continuously operably cutting means for transversely cutting said tubing into individual bag lengths, a continuously moving bag sealing means including a rotary body having a plurality of equi-spaced sealing stations at the periphery thereof, an endless belt travelling at the same speed as and mounted in contact with a substantial extent of the periphery of the body to constrain the bag lengths to move with the stations, means for feeding said bag lengths to said sealing stations to position each bag length with the leading end thereof in contact with the periphery of the body and to move therewith beneath the belt, so that its trailing end will overlie a sealing station, heat and pressure applying means operable in response to movement of the body to a position where said trailing ends overlie said stations to positively grasp and apply localized heat and pressure transversely along the opposite faces of the trailing end of each bag length and effect sealing of the said trailing end during continued simultaneous movement of the length and body and movable gripping means in the path of movement of the periphery of the body and corresponding in number with the number of stations for positively gripping the leading end of successive bag lengths and removing the same from the body after they have been sealed, and said heat and pressure applying means being operable in response to the continued movement of the cylinder to release the application of pressure to said trailing ends after the respective gripping means have positively gripped the leading ends of successive lengths.

8. Apparatus for making bags from a continuous running length of tubing of thermoplastic or like material comprising cutting means for transversely cutting said tubing transversely into bag lengths, a continuously movable bag sealing means including a rotary body having a plurality of equi-spaced heating elements at the periphery thereof, guide means for guiding successive bag lengths into engagement with the body to position the rear ends of successive lengths in overlying relation with respect to the successive heating elements, movable means carried by the body for cooperation with each heating element for positively pressing the rear end of the lengths against the heating elements to seal the same, an endless belt travelling at the same speed as and disposed in contact with a substantial extent of the periphery of the rotary body from a position displaced along the path of movement of the surface of the body from the guide means so as to constrain the ungrasped leading ends of successive lengths to move with the body during the sealing thereof and means along the path of movement of the surface of the body and positioned after the guide means relative to the path of movement of the lengths for positively grasping opposite faces of the leading ends of successive sealed bag lengths and removing the same from the body after they have been sealed.

9. Apparatus for making bags from a continuous running length of tubing of thermoplastic material comprising cutting means for transversely cutting said tubing into bag lengths, a continuously moving bag sealing means comprising a plurality of axially spaced discs and means providing a plurality of equi-spaced sealing stations extending transversely across the perimeter of the discs, each station including heating means movable with the discs and gripper means movable with the discs and toward and away from the heating means for cooperation therewith to press the trailing end of successive lengths against the heating means, means for feeding successive lengths into engagement with the periphery of the discs to position the trailing end of each length as regards its direction of feed to overlie the successive heating means, means for moving said gripper means toward the heating means to press said trailing ends against the heating means to apply heat and pressure to such trailing ends to effect sealing thereof, means independent of the discs and cooperable therewith for constraining the ungrasped leading ends of the lengths to move with the heating means a distance such as to ensure adequate sealing of the pressed trailing ends, moveable, grasping and withdrawing means in the path of movement of heating elements for grasping the leading ends of successive lengths after sealing thereof to positively remove successive lengths from the successive heating means and means for moving said gripper means away from said heating means to permit complete removal of such lengths.

10. Apparatus for making bags from a continuous running length of tubing of thermoplastic material, comprising cutting means for cutting the tubing transversely into individual bag lengths, a continuously moving bag sealing means comprising a rotatable body and means providing a plurality of equi-spaced sealing stations on the perimeter of the body, said last-mentioned means including means for positively grasping opposite faces of one end of a bag length and for applying heat thereto transversely across said one end, means for feeding said bag lengths into contact with said body to position a bag length at each sealing station with the rear end of each length, as regards the direction of feed, overlying a sealing station, means for constraining each length to move in contact with said body for a distance such as to ensure adequate sealing, another rotatable body mounted adjacent to said first body, movable gripper elements corresponding in number to the number of stations for cooperation with the periphery of said last-mentioned body for positively grasping the leading ends of and removing successive bag lengths from the respective sealing stations after they have been sealed, and the rotation of the two bodies and the mutual spacing of the gripper elements and the sealing stations being such that successive gripper elements will remove a sealed bag from successive sealing stations.

11. Apparatus for making bags from a continuous length of tubing of thermoplastic material, comprising severing means for severing said tubing into individual bag lengths, a continuously moving bag sealing means providing a plurality of spaced sealing stations, heating elements and cooperating movable gripping means at each sealing station to effect sealing of one end of the bag lengths, continuously movable feeding means for feeding said bag lengths to said sealing means to position a bag length at each sealing station with the rear end thereof as regards the direction of feed overlying a heating element, means for actuating said gripping means to apply such rear ends against said elements, means for constraining the ungripped leading end of successive bags to move with the stations a distance such as to ensure adequate sealing of the rear ends of the lengths, and grasping and withdrawing means at a subsequent position in the path of movement of the stations for positively grasping the leading ends of and withdrawing successive bag lengths from said stations after the rear ends of the lengths have been sealed.

References Cited in the file of this patent

UNITED STATES PATENTS

| | | |
|---|---|---|
| 2,392,695 | Rohdin | Jan. 8, 1946 |
| 2,652,879 | Keller et al. | Sept. 22, 1953 |
| 2,680,471 | Mercer | June 8, 1954 |
| 2,698,046 | Finke | Dec. 28, 1954 |
| 2,707,985 | Binnall | May 10, 1955 |
| 2,710,641 | Strickelber | June 14, 1955 |
| 2,768,673 | Gaubert et al. | Oct. 30, 1956 |
| 2,780,275 | Rusch et al. | Feb. 5, 1957 |